(12) United States Patent
Hietalahti et al.

(10) Patent No.: US 8,504,017 B1
(45) Date of Patent: Aug. 6, 2013

(54) METHOD, APPARATUS AND COMPUTER PROGRAM PRODUCT FOR A USER TERMINAL

(71) Applicant: Renesas Mobile Corporation, Tokyo (JP)

(72) Inventors: Hannu Petri Hietalahti, Kiviniemi (FI); Samuli Heikkinen, Oulu (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/633,926

(22) Filed: Oct. 3, 2012

(30) Foreign Application Priority Data

Mar. 7, 2012 (GB) .................................. 1204039.0

(51) Int. Cl.
*H04W 4/00* (2009.01)
*H04W 36/00* (2009.01)

(52) U.S. Cl.
USPC ....................................................... 455/426.1

(58) Field of Classification Search
USPC .................. 455/426, 434–438, 440; 370/331
See application file for complete search history.

(56) References Cited

U.S. PATENT DOCUMENTS 6,487,410 B1 * 11/2002 Kontio et al. ................. 455/437
2011/0021216 A1 * 1/2011 Pudney et al. ................ 455/466

FOREIGN PATENT DOCUMENTS

GB           2475094 A       5/2011
WO     WO 2011/119862 A1    9/2011

OTHER PUBLICATIONS

Combined Search and Examination Report under Section 17 and 18(3) dated Jun. 27, 2012 which is issued in a related British Application No. GB1204039.0 (5 pages).

* cited by examiner

*Primary Examiner* — Nizar Sivji
(74) *Attorney, Agent, or Firm* — Lucas & Mercanti LLP; Robert P. Michal

(57) ABSTRACT

A method including detecting a preference of a user terminal for a predetermined service, detecting that the current RAT does not provide the predetermined service; monitoring whether another PLMN or RAT of the first PLMN is available; upon detecting that no other PLMN or RAT of the first PLMN is available, maintaining connection to the first RAT of the first PLMN until another PLMN or RAT in the first PLMN becomes available; upon detecting that another PLMN or RAT is available, considering the first RAT of the first PLAIN as disabled, and generating an information element to a memory according to which the first RAT of the first PLMN has been marked as disabled, wherein the information element is valid until a predetermined criterion is met and at least beyond a point of time when the user terminal switches to another PLMN and/or to another RAT.

21 Claims, 4 Drawing Sheets

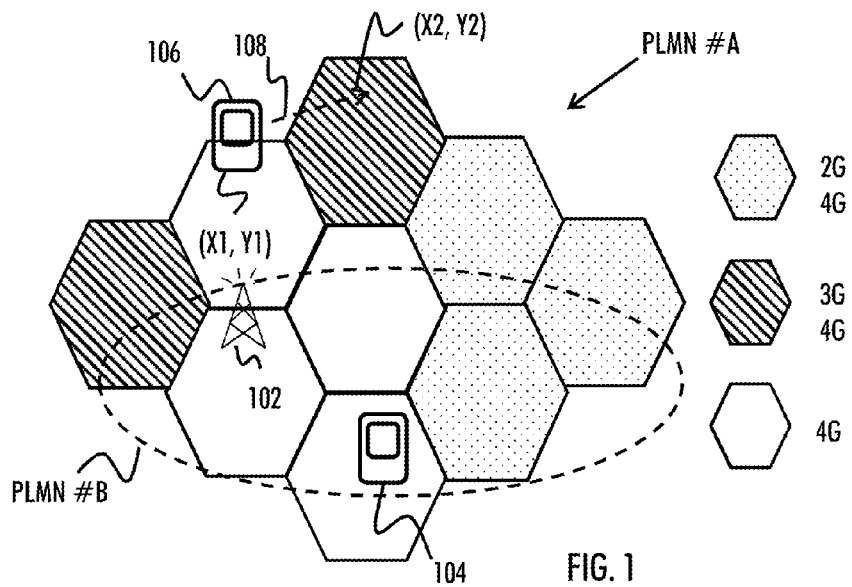
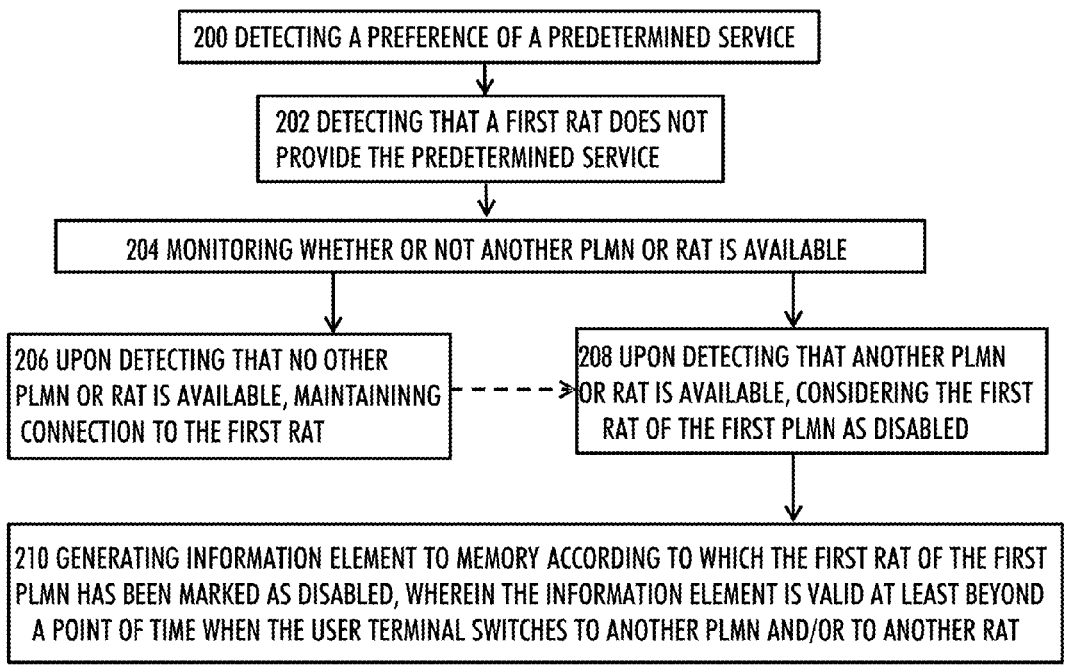
FIG. 2

304 CONSIDERING THE FIRST PLMN FOR THE SELECTION WHEN THE FIRST PLMN BECOMES AVAILABLE VIA A SECOND RAT DIFFERENT THAN THE FIRST RAT

| | PLMN | GERAN | UTRAN | EUTRAN | EUTRAN DISABLED |
|---|---|---|---|---|---|
| RPLMN → | PLMN #A | | | X | |
| | PLMN #B | X | X | X | |

| | PLMN | GERAN | UTRAN | EUTRAN | EUTRAN DISABLED | |
|---|---|---|---|---|---|---|
| | PLMN #A | | | X | X | ← 400 |
| RPLMN → | PLMN #B | X | X | X | | |

| PLMN | GERAN | UTRAN | EUTRAN | EUTRAN DISABLED |
|---|---|---|---|---|
| PLMN #A | | | X | X |
| PLMN #B | | | X | X |
| PLMN #C | | X | X | |
| PLMN #D | | | X | X |

RPLMN → PLMN #C

FIG. 5

LOCATION (X1, Y1)

| PLMN | GERAN | UTRAN | EUTRAN | EUTRAN DISABLED |
|---|---|---|---|---|
| PLMN #A | | | X | |

FIG. 6A

LOCATION (X2, Y2)

| PLMN | GERAN | UTRAN | EUTRAN | EUTRAN DISABLED |
|---|---|---|---|---|
| PLMN #A | | X | X | X |

FROM 210

700 CONNECTING TO A SECOND RAT OF THE FIRST PLMN

702 PERFORMING SCANNING OF AVAILABLE RATS IN ORDER TO SELECT A RAT TO CONNECT TO, WHEREIN THE SELECTION IS AT LEAST PARTIALLY BASED ON THE VALID INFORMATION ELEMENT

FIG. 7A

704 CONSIDERING THE FIRST RAT FOR THE SELECTION ONLY WHEN THE FIRST RAT BECOMES THE ONLY AVAILABLE RAT FOR THE FIRST PLMN

FIG. 7B

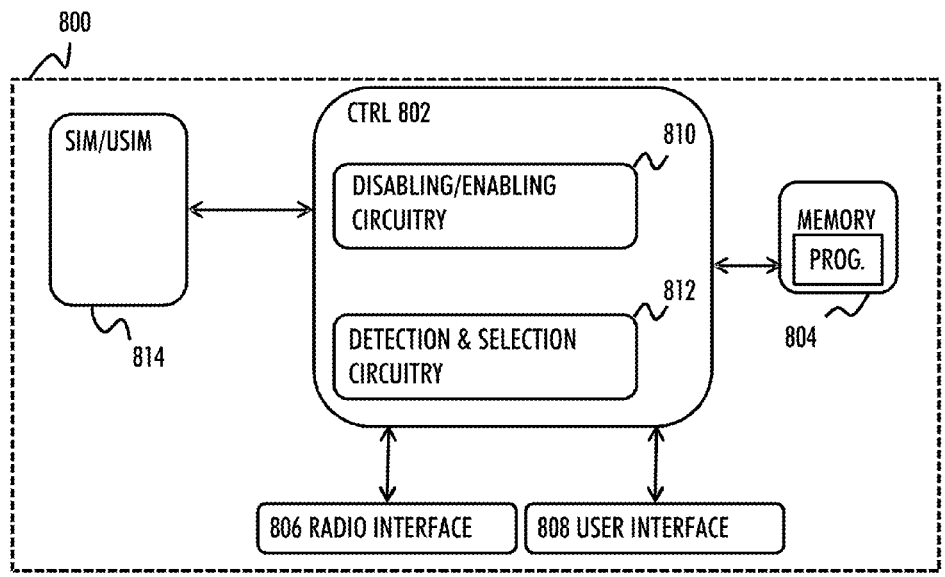

FIG. 8

900 DETECTING A TRACKING AREA IDENTIFIER OF THE FIRST PLMN WHERE THE FIRST RAT IS CONSIDERED AS DISABLED

↓

902 ASSOCIATING THE INFORMATION ELEMENT WITH THE DETECTED TRACKING AREA IDENTIFIER

FIG. 9A

904 CONSIDERING THE FIRST PLMN FOR THE SELECTION WHEN THE FIRST PLMN BECOMES AVAILABLE VIA ANOTHER TRACKING AREA

FIG. 9B

METHOD, APPARATUS AND COMPUTER PROGRAM PRODUCT FOR A USER TERMINAL

CROSS REFERENCE TO RELATED APPLICATION

This application claims the benefit under 35 U.S.C §119(a) and 37 CFR 1.55 to UK patent application No. GB1204039.0 filed on 7 Mar. 2012, the entire content of which is hereby incorporated herein by reference.

FIELD OF THE INVENTION

Embodiments of the invention relate generally to a method or apparatus or computer program product for a user terminal in a mobile communication network. More particularly, some embodiments of the invention relate to improving efficiency of a cellular communication network. Further, some embodiments of the invention relate to a change of a public land mobile network (PLMN) and/or a radio access technology (RAT).

BACKGROUND OF THE INVENTION

A packet-based radio access technology (RAT), such as the Long Term Evolution (LTE) or the LTE-Advanced (LTE-A) of the 3$^{rd}$ Generation Partnership Project (3GPP), may offer a large variety of services. However, packet-based networks may not be able to provide certain services, such as traditional circuit switching-based speech services, for example. Such speech or voice services may need to be acquired from a RAT that supports circuit switching. It may happen that the RAT supporting circuit switching is currently not available in a registered public land mobile network (PLMN). Therefore, a user terminal may need to register to another PLMN or change to a RAT with circuit switching support at a later time.

SUMMARY OF THE INVENTION

In a first exemplary embodiment of the invention, there is a method of using a user terminal, the method comprising: detecting a preference of a user terminal for a predetermined service, wherein the user terminal is currently connected to a first public land mobile network, PLMN, at a current location of the user terminal via a first radio access technology, RAT; detecting that the first RAT does not provide the predetermined service; monitoring whether or not another PLMN or another RAT of the first PLMN is available; if, based on the monitoring, it is detected that another PLMN or another RAT of the first PLMN is available, considering the first RAT of the first PLMN as disabled due to lack of the predetermined service from the first RAT, and generating an information element to a memory according to which the first RAT of the first PLMN has been marked as disabled, wherein the information element is valid until a predetermined criterion is met and at least beyond a point of time when the user terminal switches to another PLMN and/or to another RAT, and wherein the information element while valid is usable to avoid selecting to connect back to the first NAN via the first RAT.

In a second exemplary embodiment of the invention, there is an apparatus for a user terminal, the apparatus comprising: at least one processor and at least one memory including a computer program code, wherein the at least one memory and the computer program code are configured to, with the at least one processor, cause the apparatus at least to: detect a preference of a user terminal for a predetermined service, wherein the user terminal is connected to a first public land mobile network, PLMN, at a current location of the user terminal via a first radio access technology, RAT; detect that the first RAT does not provide the predetermined service; monitor whether or not another PLMN or another RAT of the first PLMN is available; if, based upon the monitoring, it is detected that another PLMN or another RAT of the first PLMN is available, consider the first RAT of the first PLMN as disabled due to lack of the predetermined service from the first RAT, and generate an information element to a memory according to which the first RAT of the first PLMN has been marked as disabled, wherein the information element is valid until a predetermined criterion is met and at least beyond a point of time when the user terminal switches to another PLMN and/or to another RAT and wherein the information element while valid is usable to avoid selecting to connect back to the first PLMN via the first RAT.

In a third exemplary embodiment of the invention, there is a computer program product embodied on a distribution medium readable by a computer and comprising program instructions which, when loaded into an apparatus for a user terminal, execute the method comprising: detecting a preference of a user terminal for a predetermined service, wherein the user terminal is currently connected to a first public land mobile network, PLMN, at a current location of the user terminal via a first radio access technology, RAT; detecting that the first RAT does not provide the predetermined service; monitoring whether or not another PLMN or another RAT of the first PLMN is available; if, based upon the monitoring, it is detected that another PLMN or another RAT of the first PLMN is available, considering the first RAT of the first PLMN as disabled due to lack of the predetermined service from the first RAT, and generating an information element to a memory according to which the first RAT of the first PLMN has been marked as disabled, wherein the information element is valid until a predetermined criterion is met and at least beyond a point of time when the user terminal switches to another PLMN and/or to another RAT and wherein the information element while valid is usable to avoid selecting to connect back to the first PLMN via the first RAT.

Further features and advantages of the invention will become apparent from the following description of preferred embodiments of the invention, given by way of example only, which is made with reference to the accompanying drawings.

BRIEF DESCRIPTION OF THE DRAWINGS

FIG. 1 presents an example public land mobile network;
FIGS. 2, 3A and 3B show methods according to some embodiments;
FIGS. 4A, 4B, 5 and 6A, 6B show example tables associating certain PLMNs with an "EUTRAN disabled"-condition, according to some embodiments;
FIGS. 7A and 7B depict methods according to some embodiments;
FIG. 8 illustrates an apparatus according to an embodiment; and
FIGS. 9A and 9B show methods according to some embodiments.

DETAILED DESCRIPTION OF THE PREFERRED EMBODIMENTS

Figures 3A, 3B, 4A, 4B:
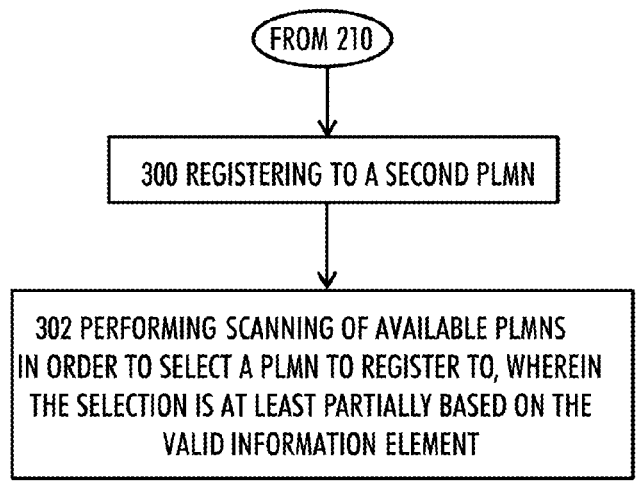

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

A public land mobile network (PLMN) #A, as shown in FIG. 1, may denote a network that is established and operated by an administration or by a recognized operator. User terminals (UT), or user equipment (UE), 104 and 106 may connect to the PLMN in order to enable mobile cellular services to take place. The UT 104, 106 may be a mobile user equipment, a palm computer, or any other apparatus capable of operating in a mobile communication network.

In FIG. 1, the PLMN #A is shown to be a continuous geographical area comprising a plurality of smaller geographical areas (shown with hexagons) which may be seen as cells, tracking areas, etc. A base station 102 may provide coverage to the cell or to a plurality of cells. However, a PLMN may also comprise several geographically separated areas, depending on the deployment of base stations providing coverage to the PLMN. Each PLMN may be identified by the code or an identifier, such as a Mobile Country Code (MCC) or the Mobile Network Code (MNC). In general, each operator providing mobile services may have its own PLMN code. The PLMNs may interconnect with other PLMNs and with a public switched telephone networks (PSTN) in order to enable telephone communications or with internet service providers in order to enable data and internet access. The UT 104, 106 in the area may connect the PLMN via a radio access technology, RAT.

Prior to registering to a cellular network, the UT 104 may need to perform a PLMN selection. In automatic PLMN selection mode, the UT 104, 106 may select the highest priority PLMN to register to among the available PLMNs. The UT 104, 106 may operate in its home PLMN (HPLMN) or equivalent home PLMN (EHPLMN). However, a visited PLMN (VPLMN) may be selected for example if the UT 104. 106 loses coverage to the HPLMN or needs to register to the VPLMN based on some other reasons. The PLMN selection may take place automatically without user interaction or manually, in which case the UT 104, 106 indicates to the user which PLMNs are available for registration.

A PLMN may cover a geographically large area. However, the accessibility to different radio access technologies may not be the same over the entire PLMN area. Different access technologies may comprise, for example, Global System for Mobile communications (GSM), General Packet Radio Service (GRPS), CDM-2000 (i.e. 1xRTT), Universal Mobile Telecommunication System (UMTS), high-speed packet access (HSPA), Long Term Evolution (LTE), and LTE-Advanced (LTE-A). For simplicity reasons and to align with the 3GPP requirements for the PLMN selection by the UT, let us consider at least GSM EDGE Radio Access Network (GERAN), where EDGE denotes Enhanced Data rates for GSM Evolution, Universal/UMTS Terrestrial Radio Access Network (UTRAN), Evolved UTRAN (E-UTRAN), CDMA 1xRTT, CDMA high rate packet data (HRPD) and GSM Compact, as specified for the PLMN selection by the 3GPP. It should be noted though that the embodiments are not limited to these RATs, but different RATs are applicable as well. The base station 102 may be an evolved node B (eNB) as in the E-UTRAN (4G), a radio network controller (RNC) or a node B (NB) as in the UTRAN (3G), a base station as in the GERAN (2G), or any other apparatus capable of controlling radio communication and managing radio resources within the cell.

For illustrative purposes FIG. 1 shows hexagons with dotted marks as areas where the PLMN is provided by the 2G and the 4G, hexagons with left leaning diagonal lines as areas where the PLMN is provided by the 3G and the 4G, and unmarked hexagons with as areas where the PLMN is provided by the 4G only. In general, different PLMNs may be provided via different RATs. Thus, the user terminal 104 may not be able to access the 3G in every location even though the UT 104, 106 may stay connected to the PLMN #A. Also, it should be noted that the coverage of the 4G might not be consistent over the coverage area of PLMN #A, although not shown here for illustrative purposes. The RATs may vary in technical requirements and specifications, and in the way the radio access is provided, for example. This may affect the services being provided, for example. Therefore, it should be noted that different RATs may provide different services or at least may use different means in providing the services.

As an example, the 2G and the 3G RATs may be able to perform circuit switching. A circuit switching (CS) is a technology where two network nodes establish a dedicated communication channel (i.e. a circuit) through the network before the nodes may communicate. This may be advantageous because the circuit may guarantee wide bandwidth of the channel and ensure that the nodes remains connected for the duration of the communication session. Such a circuit switching may be applied for voice data transfers, for example, in order to reach high quality of service (QoS) without interruptions. However, for example the 4G may apply only packet switching in contrast to the circuit switching. Packet switching shares available network bandwidth between multiple communication sessions.

Although, for example, voice services may be provided by the 4G as a packet service, such as voice over IP (VOIP), some UTs 104, 106 may not support VoIP, and thus require voice centric services via the CS based RATs (or RATs supporting circuit switching), or based on UT configuration or user choice, prefers CS domain for voice services. However, it may be that the UT 104, 106 currently connected to the first PLMN #A, which is at the current location of the UT 104, 106, available only via a first RAT, such as the 4G. However, the 4G may not provide the required service. At least partially due to the location of the UT 104, 106, a well-known circuit switched fallback (CSFB) procedure or a selection of a CS cell may not be successful. Therefore, it may be that the UT 104, 106 may need to switch to another PLMN through a PLMN selection. In order to do so, the UT 104, 106 may temporarily disable its EUTRAN capability, i.e. the capability to access to the 4G RAT. As a consequence the PLMN selection may lead to selection of a PLMN that is not the highest priority PLMN among the available PLMNs, assuming there is at least one other PLMN available. This may be due to the fact that, in an automatic PLMN selection mode, the UT 104, 106 may automatically attempt to register to the highest priority PLAIN that is available. After successful attachment the second PLMN #B becomes the new registered PLMN (RPLMN).

Let us denote the second highest priority PLMN as a PLMN #B shown in FIG. 1 with a dashed ellipse. The PLMN #B may also be provided by a variety of RATs, although not shown in FIG. 1 for simplicity reasons. It should be noted that in FIG. 1, the UT 104 may be able to select the PLMN #B but the UT 106 may locate outside the coverage area of the PLMN #B. Let us further assume that the PLMN #A has higher priority than the PLMN #B at least for the UT 104. According to 3GPP TS 24.301, this selection of the PLMN #B is one of the conditions when the UT 104 stops considering the EUTRAN capability as disabled. As a consequence, the UT 104 may consider its EUTRAN enabled upon registering to the PLMN #B. As the UT 104 is now in the PLMN #B which is not the UT's 104 primary PLMN choice, the UT 104 may perform a background scan in order to find the PLMN with a higher priority. Due to the fact that the EUTRAN is enabled, the UT 104 may find the PLMN #A again. This may lead to the same situation where the PLMN #A is not able to provide the requested service and, thus, lead to a so called "ping pong-effect" between the two PLMNs #A and #B. Another variant of the problem occurs when the UT 104, after having disabled its EUTRA capability in the PLMN #A, does not find any other available PLMN, as may be the case for the UT 106.

Therefore, it is proposed in an embodiment, as shown in FIG. 2, to detect a preference of the UT 104, 106 for a predetermined service in step 200. It should be noted that the UT 104, 106 may currently be connected to the first PLMN #A which is at the current location of the UT 104 available only via the first RAT. The first RAT may be a packet switching-based RAT, such as the EUTRAN/4G as marked in FIG. 1. The required service may thus be at least one of a group of predetermined services. It may be that the predetermined services are known to be provided only by a RAT supporting circuit switching, not the PS-based EUTRAN/4G.

In step 202, it may be detected that the first RAT (e.g. EUTRAN) does not provide the predetermined service. As said, the predetermined service may be a service provided by a circuit switching-based RAT, thus not by the packet switching-based first RAT. Examples of such predetermined services may include: voice or speech and their supplementary services (e.g. call waiting, call forwarding) and video streaming, etc. As a consequence, the UT 104 may not be able to acquire the service unless the UT 104 changes to another RAT of the same first PLMN #A or to another, second PLMN #B.

In step 204, the UT 104, 106 may monitor whether or not at least one other PLMN or at least one other RAT is or becomes available. The UT 104, 106 may thus detect the availability of at least one other PLMN or at least one other RAT. Such monitoring may be based on PLMN or RAT identifiers received by the UT 104, 106, for example.

As shown with a user terminal 106 in FIG. 1, there may be a scenario where the UT 106 is located such that only the PLMN #A is available. Therefore, in step 206, upon detecting that no other PLMN #B or another RAT is available, the UT 106 may maintain connection to the first RAT of the first PLMN #A until another PLMN #B or another RAT, such as 2G and/or 3G (being CS-supporting RATs), in the first PLMN #A becomes available, if the second PLMN #B is available, as may be the case with the UT 104, the UT 104 attempts registration to the second PLAIN #B and, thus, in this case the UT 104 need not remain registered to the PLMN #A, However, the UT 106 may need to remain connected to the EUTRAN of the RPLMN #A. In other words, the UT 106 may omit the EUTRAN disabling and remain registered to the MAIN #A at least for the packet switching services of EUTRAN until other RAT (2G and/or 3G) of the RPLMN #A or some other PLMN #B becomes available. This may be advantageous as it may be more efficient to remain registered for PS services only rather than disabling EUTRAN/4G and entering a limited service state possibly without any acceptable cell to camp on.

Upon detecting that a PLMN #B or another RAT is available in step 208, the UT 104, 106 may consider the first RAT 4G of the first PLMN #A as disabled due to lack of the predetermined service from the first RAT 4G. Such consideration may take place substantially immediately after the step 202 where it is detected that the EUTRAN may not provide the required service. On the other hand, such consideration may take place, for example, retrospectively by marking up the EUTRAN part of the RPLMN #A as disabled when another RAT 2G or 3G, or the second PLMN #B becomes available and the UT 104 switches to the new RAT of the RPLMN #A or to the second PLMN #B. Owing to such disabling, the UT 104, 106 may connect to the other RAT or to the other PLMN #B, even though the other RAT (2G, 3G) or the other PLMN #B may not be of higher priority than the EUTRAN or the PLMN #A, respectively.

In an embodiment, the UT 104, 106 first detects no other PLMN or RAT and thus proceeds to step 206. Thereafter, the UT 104, 106 may detect another PLMN or another RAT and consequently proceed in step 208, as shown with a dotted arrow in FIG. 2.

In step 210, the UT 104, 106 may generate an information element according to which the first RAT (e.g. the 4G) of the first PLMN #A has been marked as disabled. The information element may be valid until a predetermined criterion is met and at least beyond a point of time when the UT 104, 106 switches to another PLMN and/or to another RAT. Beyond the point of time of the switch denotes time after the UT 104, 106 has successfully registered to the selected PLMN, such as to the second PLMN #B, or a time after the UT 104, 106 has successfully connected to another RAT (e.g. the 2G or the 3G) than the current first RAT. In other words, the UT 104, 106 may memorize the disabling of the first RAT of the first PLMN. The UT 104, 106 may then use that memorized knowledge later on for subsequent PLMN and/or RAT selections, as will be described later. The UT 104, 106 may associate information related to the disabling of EUTRAN with each PLMN that returned ATTACH and/or tracking area update (TAU) information and lead to the disabling condition of the EUTRAN. During the time the information element is valid, the information element may be kept in memory of the UT 104 or otherwise accessible to the UT 104. After the information element is invalid, the memory location corresponding to the information element may be released for other purposes, for example. The invalidation of the information element may denote that the disabled first RAT is from then on considered as enabled.

Owing to the valid information element, the switch to another PLMN (i.e. PLMN selection) or to another RAT may not cause the UT 104, 106 to consider the EUTRAN of the first PLMN #A (or any other PLMN) as enabled but to still consider the EUTRAN of the first PLMN #A as disabled. Alternatively, when the UT 104, 106 switches to the other PLMN #B, the UT 104, 106 may, according to the 3GPP specifications, mark the EUTRAN part of the first PLMN #A as enabled at some registry element, but the UT 104, 106 may still keep the information element valid and thus use the information element in subsequent PLMN/RAT selections, for example. In the latter case, the information element may be seen as an additional piece of information along with the original disabling/enabling information. The information element associating the first PLMN #A with an information according to which the EUTRAN part of the first PLMN #A is or has been at some point marked as disabled, is kept valid for a longer time than the original disabling/enabling information. In other words, the selection or registration to the new PLMN #B does not cause the UT 104, 106 to release or invalidate the information element. This may be advantageous as the stored information element may be used to avoid selecting back to EUTRAN part of a higher priority PLMN (in this case PLMN #A), as will be described later, if that higher priority PLMN #A is known not to provide the services that are considered critical for the UT 104, 106.

In some embodiments, as shown in FIGS. 3A, 3B and 4, the UT 104 may currently reside on a location where the current RPLMN #A is only available via the EUTRAN, as shown in FIG. 4A. However, there may be another PLMN #B available as well. At the beginning neither of the PLMNs #A or #B is marked as EUTRAN disabled, as illustrated in FIG. 4A. As the RPLMN #A via the 4G is not able to provide the required service(s), upon detecting that a second PLMN #B different than the first PLMN #A is available, the UT 104 may in step 300 of FIG. 3A register to the second PLMN #B in order to possibly acquire the required service through the PLMN #B. This is shown in FIG. 4B, where the UT is registered to the RPLMN #B and the UT 104 has generated the information element 400 according to which the EUTRAN of the PLMN #A is or has been marked as disabled. The UT 104 may first select the PLMN #B and then register to the PLMN #B. Only after the registration, the UT 104 may be able to receive services from the second PLMN #B. The UT 104 may register to the PLMN #B via any of the available RATs, such as GERAN, UTRAN or EUTRAN. When the UT 104 applies the EUTRAN, the UT 104 may still receive the required service by later on switching to the GERAN or the UTRAN of the PLMN #B, or by requesting the CSFB-procedure, for example.

The second PLMN #B may not be the PLMN of highest priority for the UT 104, The priority list of PLMNs may be precoded for the UT 104. Such priority list may be stored on the subscriber identity module (SIM) card or to the universal SIM (USIM) card of the UT 104, for example. The priority of the PLMNs may be specified by the operator or by the user, for example. Let us assume that the lists of FIGS. 4A and 4B reflect the priorities between the PLMNs. By monitoring such priority list of PLMNs, the UT 104 may observe that the current RPLMN #B may be the second highest PLMN, or in general, not the PLMN of the highest priority. Therefore, the UT 104 may in step 302 of FIG. 3A, while being registered to the second PLMN #B, perform a background scan of available PLMNs for selecting a higher priority PLMN to attempt registration to, wherein the selection is at least partially based on the valid information element. The background scanning may be an automatic procedure performed by the UT 104 when it detects that the UT 104 is currently not in the PLMN of highest priority. The scan of a higher priority PLMN may result in the case where the PLMN #A is considered as one possible PLMN candidate.

However, in an embodiment as shown in step 304 of FIG. 3B, the UT 104 may, owing to the valid information element, consider the first PLMN #A for the selection when the first PLMN #A becomes available via a second RAT different than the first RAT. The UT 104 may thus avoid selecting the first PLMN #A unless the first PLMN #A becomes available via a second RAT different than the first RAT. The second RAT may be a circuit switching-based RAT, such as the GERAN or the UTRAN, for example. This is because only the EUTRAN part of the first PLMN #A has been marked as disabled according to the information element. It may be that the UT 104, in some embodiments, re-enables its EUTRAN capability after the selection of the PLMN #B. However, due to the fact that the information element is still valid and taken into account, the UT 104 may avoid selecting the higher priority first PLMN #A if it is available only via the EUTRAN.

In an embodiment, as shown in step 900 of FIG. 9A, the UT 104 may identify the tracking area (e.g. determine the tracking area identifier) the first PLMN #A where the EUTRAN is considered as disabled. In the GSM, mobiles may be tracked in Location Areas (LA) and Routing Areas (RA). In the UTRAN, mobiles may be tracked in UTRAN Registration Areas (URA) as well as LAs and RAs. In the LTE, a Tracking Area (TA) is used as a generic name for LA, RA and URA. The tracking area may also be seen as an example term and basically any area to which the UT 104, 106 may be located is a tracking area. As a result, the first RAT may be considered disabled, not only with respect to the first PLMN #A, but also with respect to the TA. The UT 104 may in step 902 associate the information element with the detected tracking area identifier in order to store information according to which the first RAT of the identified tracking area of the first PLMN has been marked as disabled. Thereafter, when the background scan, during being registered to the second PLMN #B, for example, reveals that the PLMN #A is available in another, second TA, the UT 104 may in step 904 of FIG. 9B decide to attempt registration to the second TA of the first PLMN #A. The UT 104 may thus avoid selecting the first PLMN #A unless the first PLMN #A becomes available via another TA than the identified TA. This may be because the EUTRAN may not be considered disabled for a second TA of the first PLMN #A, but only for the first, identified TA.

In an embodiment, the first PLMN #A is considered only when at least one of the following takes place: the first PLMN #A becomes available via a second RAT different than the first RAT, and the first PLMN #A becomes available via another tracking area different than the identified tracking area.

In an embodiment, the information element comprises information according to which the first RAT (e.g. EUTRAN/4G) has been marked as disabled in a plurality of PLMNs when there is a plurality of PLMNs to which the UT 104, 106 has been registered to but which are available only via the first RAT. Thus, the UT 104, 106 may not have acquired the required service in any of the registered PLMNs. Looking at FIG. 5, let us assume that a UT has originally register to the PLMN #A. However, upon not receiving the required service via the EUTRAN and noticing that no other RAT is available in the PLMN #A, the EUTRAN of the PLMN #A may be considered as disabled, the UT may generate the information element regarding the disabling and may register to the PLMN #B, which has the second highest priority after the PLMN #A. However, contrary to FIG. 4B, the PLMN #B is now found not to provide access via any RAT supporting circuit switching. Thus, the UT may disable the EUTRAN of the PLMN #B and generate an information element or update the existing information element regarding the disabling. The UT may scan other PLMNs in the area and find PLMNs #C and #D. PLMN #A and #B may not be considered as they are only available via the disabled EUTRAN. However, the UT may not be successful in registering to the PLMN #C for some reason. Thus, PLMN #D, being the next in the priority order, may be attempted and the UT may register successfully to the PLMN #D. However, it may again be detected that no other RAT than EUTRAN is available in the PLMN #D. Therefore, the EUTRAN part of the PLMN #D may be disabled and a corresponding information element may be generated or the existing information element may be updated. Thus, as shown in FIG. 5, the EUTRAN parts of the PLMNs #A, #B, and #D may be considered disabled. Then, the UT may again scan for the higher priority PLMNs. As a result, the UT finds again the PLMN #C. The PLMN #C has the highest priority among the found PLMNs without EUTRAN disabling condition. Thus, the UT may attempt to register to the PLMN #C and may be successful in the registration. Thereafter, the UT receives the required service via the UTRAN of the PLMN #C. However, for the background scan, while being registered to the PLMN #C, the PLMNs #A and #B may not be considered unless they become available via some other RAT(s) than the disabled EUTRAN, at least as long as the information element(s) is/are valid. The PLMN #D may not be considered due to the disabled EUTRAN-condition or due to the fact that the PLMN #D has a lower priority than the current RPLMN #C.

In an embodiment, one of the predetermined criteria for invalidating the information element with respect to at least one PLMN comprises, while being registered to the second PLMN #B, detection that the first MAIN #A becomes available via the second RAT different than the first RAT. For example, when the first PLMN #A becomes available via the GERAN and/or the UTRAN, the generated information element or at least the part of the information element referring to the PLMN #A, is invalidated. The UT 104 may register to the PLMN #A even via the EUTRAN, and after that may still receive the required service by switching to the GERAN or the UTRAN, or by requesting the CSFB-procedure, if applicable.

It should be noted that the information element may be invalidated totally or only in part. For example, when the information element comprises disabling information for a plurality of PLMNs, the invalidation may be PLMN-specific. A disabling-condition of a certain PLMN may be invalidated from the information element, when that certain PLMN, currently marked as EUTRAN disabled, becomes available in another RAT. However, the information element may still consider some other PLMNs as EUTRAN disabled.

In an embodiment, as shown in FIGS. 1 and 6 the UT 106 may be located in a location (X1, Y1) such that no other PLMN (than the PLMN #A) is currently available as shown in FIG. 6A. Moreover, the RPLMN #A may be available only via the EUTRAN. In this case the UT 106 may decide to remain camped on the EUTRAN of the PLMN #A and not to mark the EUTRAN as disabled. However, the UT 106 may be moving as shown with reference numeral 108 so that a second RAT, such as the 3G/UTRAN, of the first PLMN #A becomes available at location (X2, Y2), as shown in FIG. 6B.

in an embodiment, as shown in step 700 of FIG. 7A, upon detecting that the 3G (it should be noted that 2G would make a similar case) is available, the UT 106 may decide to connect to the 3G. A change of RAT may take place by means of a cell reselection, handover, a redirection, or a cell change order, for example. Further, the information element 600 of FIG. 6B may be generated upon the connection to the 3G as the second RAT. Thus, when another RAT than the EUTRAN is selected, then at that point the UT 106 may retrospectively mark up the EUTRAN part of the RPLMN #A as disabled and establish the information element regarding the disabling of the EUTRAN. It should be noted that even though the EUTRAN of the RPLMN #A is or has been disabled, the RPLMN #A may be acceptable PLMN via the other RATs that the EUTRAN.

In an embodiment, as shown in step 702 of FIG. 7A, while being connected to the second RAT (3G in this case) of the first PLMN #A, the UT 106 may perform a background scan of available RATs for selecting a higher priority RAT to connect to. Such background scan may be automatic when the current RAT is not the first in the list of RAT priorities. Such priority list of RATs may also be precoded to the UT 106, possibly associated to the PLMN selector list stored in the SIM/USIM of the UT 106. It may be appreciated that the cell (re)selection criteria may be overridden by the need to select a suitable cell of other RAT as soon as possible. However, now the possible selection of a new RAT due to the background scan may be at least partially based on the valid information element. Thus, the UT 106 may memorize the "EUTRAN disabled"-condition in order to apply it later, for example when more RATs of the same RPLMN #A become available. This may be advantageous in that once the RPLMN #A has been marked up as "EUTRAN disabled", then while being registered to the RPLMN #A via the GERAN or the UTRAN, the UT 106 may avoid losing voice service due to selection of the EUTRAN. Without memorizing the "EUTRAN disabled"-condition, the UT 106 could possibly select the EUTRAN if the EUTRAN has higher priority than the other available RATs.

In an embodiment, as shown in step 704 of FIG. 7B, the UT 106 may consider the first RAT (e.g. the EUTRAN) for the selection only when the first RAT becomes the only available RAT for the first PLMN #A. A further criterion may be that there is no other PLMNs available. For example, when the moving trajectory comprises segments when there is only PLMN #A available and only via the EUTRAN (the 3G coverage may disappear during the movement), the UT 106 decides to go back to the EUTRAN even though the EUTRAN has been marked as disabled according to the valid information element. Thus, the UT 106 overrides the valid information element.

In an embodiment, the predetermined criteria for invalidating the information element with respect to at least one PLMN comprises at least one of the following: switching off the UT 104, 106, removal of the SIM/USIM from the UT 104, 106, insert of a new SIM/USIM to the UT 104, 106 (such as to a dual SIM UT), change of a tracking area (TA) or a location area (LA) of the UT 104, 106, expiry of a predetermined time duration, detection of a predetermined user action related to the UT 104, 106. The predetermined duration may be, for example, 24 hours. The predetermined user action may be, for example, change of operation mode of the UT 104, 106. For example, the operation mode may be changed from CS/PS mode 1 to CS/PS mode 2, which indicates a change from voice centric operation mode to a data centric operation mode. After such change, the EUTRAN may be able to provide the most critical services needed by the UT.

An embodiment, as shown in FIG. 8, provides an apparatus 800 comprising a control circuitry (CTRL) 802, such as at least one processor, and at least one memory 804 including a computer program code (PROG), wherein the at least one memory 804 and the computer program code (PROG), are configured, with the at least one processor 802, to cause the apparatus 800 to carry out any one of the embodiments. It should be noted that FIG. 8 shows only the elements and functional entities required for understanding a processing system of the apparatus 800. Other components have, been omitted for reasons of simplicity. It is apparent to a person skilled in the art that the apparatus may also comprise other functions and structures.

In an embodiment, the apparatus 800 may comprise the terminal device of a cellular communication system, e.g. a computer (PC), a laptop, a tabloid computer, a cellular phone, a communicator, a smart phone, a palm computer, or any other communication apparatus. Alternatively, the apparatus 800 is comprised in such a terminal device. Further, the apparatus 800 may be or comprise a module (to be attached to the UT) providing connectivity, such as a plug-in unit, an "USB dongle", or any other kind of unit. The unit may be installed either inside the UT or attached to the UT with a connector or even wirelessly.

The apparatus 800 may comprise a control circuitry 802, e.g. a chip, a processor, a micro controller, or a combination of such circuitries causing the apparatus to perform any of the embodiments of the invention. The control circuitry 802 may be implemented with a separate digital signal processor provided with suitable software embedded on a computer readable medium, or with a separate logic circuit, such as an application specific integrated circuit (ASIC). The control circuitry 802 may comprise an interface, such as computer port, for providing communication capabilities. The memory 804 may store software (PROG) executable by the at least one control circuitry 802.

The apparatus 800 may comprise the memory 804 connected to the control circuitry 802. However, memory may also be integrated to the control circuitry 802 and, thus, no memory 804 may be required. The memory 804 may be implemented using any suitable data storage technology, such as semiconductor based memory devices, flash memory, magnetic memory devices and systems, optical memory devices and systems, fixed memory and removable memory. The memory 804 may be for storing data related to information element, the disabling/enabling condition of at least one PLMN, the priorities of the RATs and PLMNs, for example.

The information element may take the form of a table where the EUTRAN disabling condition is indexed by at least one PLMN. Alternatively, the information element may comprise a list indicating only those PLMNs where the first RAT is or has been marked as disabled. For example, the information element may comprise the latest PLMN codes (MCC+MNC) of the networks associated with the same "EUTRAN disabled"-condition to ensure that the EUTRAN part of those PLMNs is not considered for any PLMN selection as long as the temporary information element is valid.

In yet one embodiment, the information element is associated with the PLMN selector list(s) maintained in the SIM/USIM of the user terminal, wherein the PLMN selector list comprises at least one RAT candidate for at least one PLMN. In an embodiment, the information element is stored as a standalone memory location in the SIM/USIM 814 comprised in the apparatus 800 as shown in FIG. 8.

The information element may reside in the SIM/USIM card, in an universal integrated circuit card (UICC) or in the memory 804. The information element may be integrated with some other data files or stored as a standalone memory location. Further, the information element may be updated each time the first RAT in a PLMN, which is currently not in the list, is or has been marked as disabled. The information element may be updated also when at least part of the information element is invalidated with respect to at least one PLMN currently comprised in the information element.

The control circuitry 802 may comprise a disabling/enabling circuitry 810 for deciding whether the first RAT of certain PLMN is to be marked as disabled and for deciding when to consider the first RAT part as enabled. The tracking area information may also be taken into account according to some of the embodiments. The circuitry 810 may also generate or establish the information element and invalidate the information element when at least one of the predetermined criteria occurs.

The control circuitry 802 may comprise a detection & selection circuitry 812 for detecting the presence of any RAT or any PLMN and to decide whether to select one of the detected RATs or PLMNs to attempt connection to. The circuitry 812 may also detect the TA identifier. The circuitry 812 may for example perform the background scanning of higher priority RATs and/or PLMNs.

The apparatus 800 may further comprise radio interface components (TRX) 806 providing the apparatus with radio communication capabilities with the radio access network. The radio interface components 806 may comprise standard well-known components such as amplifier, filter, frequency-converter, (de)modulator, and encoder/decoder circuitries and one or more antennas.

The apparatus 800 may also comprise a user interface 808 comprising, for example, at least one keypad, a microphone, a touch display, a display, a speaker, etc. The user interface 808 may be used to control the apparatus 800 by the user.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A method of using a user terminal, the method comprising:
   detecting a preference of the user terminal for a predetermined service, wherein the user terminal is currently connected to a first public land mobile network, PLMN, at a current location of the user terminal via a first radio access technology, RAT;
   detecting that the first RAT does not provide the predetermined service;
   monitoring whether or not another PLMN or another RAT of the first PLMN is available;
   if, based on the monitoring, it is detected that another PLMN or another RAT of the first PLMN is available, considering the first RAT of the first PLMN as disabled due to lack of the predetermined service from the first RAT, and generating an information element to a memory according to which the first RAT of the first PLMN has been marked as disabled, wherein the information element is valid until a predetermined criterion is met and at least beyond a point of time when the user terminal switches to another PLMN and/or to another RAT, and wherein the information element while valid is usable to avoid selecting to connect back to the first PLMN via the first RAT,
   upon detecting that a second PLMN different than the first PLMN is available, registering to the second PLMN; and
   while being registered to the second PLMN, performing a background scan of available PLMNs for selecting a higher priority PLMN to attempt registration to, wherein the selection is at least partially based on the valid information element.

2. The method of claim 1, wherein, if, based on the monitoring, it is initially detected that no other PLMN and no other RAT of the first PLMN is available, maintaining connection to the first RAT of the first PLMN until, it is detected, that the another PLMN or the another RAT in the first PLMN is available.

3. The method of claim 1, further comprising:
   detecting a tracking area identifier of the first PLMN where the first RAT is considered as disabled; and
   associating the information element with the detected tracking area identifier in order to store information according to which the first RAT of the identified tracking area of the first PLMN has been marked as disabled.

4. The method of claim 1, further comprising at least one of:
   considering the first PLMN for the selection when the first PLMN becomes available via a second RAT different than the first RAT; and
   considering the first PLMN for the selection when the first PLMN becomes available via another tracking area different than the identified tracking area.

5. The method of claim 1, wherein at least one of:
   the second PLMN has a lower selection priority than the first PLMN;
   the information element comprises information according to which the first RAT has been marked as disabled in a plurality of PLMNs when there is a plurality of PLMNs to which the user terminal has been registered to but which are available only via the first RAT; and
   the predetermined criterion for invalidating the information element with respect to at least one PLMN comprises, while being registered to the second PLMN, detection that the first PLMN becomes available via the second RAT different than the first RAT.

6. The method of claim 1, further comprising:
   upon detecting that no other PLMN is currently available and a second RAT of the first PLMN becomes available, connecting to the second RAT, wherein the information element is generated upon the connection to the second RAT.

7. The method of claim 6, further comprising:
   while being connected to the second RAT of the first PLMN, performing a background scan of available RATs for selecting a higher priority RAT to connect to, wherein the selection is at least partially based on the valid information element.

8. The method of claim 7, further comprising:
   considering the first RAT for the selection only when the first RAT becomes the only available RAT for the first PLMN.

9. The method of claim 1, wherein at least one of:
   the first RAT is a packet switching based RAT, and the predetermined service is a service provided by a RAT supporting circuit switching;
   the predetermined criterion for invalidating the information element with respect to at least one PLMN comprises at least one of the following: switching off the user terminal, removal of subscriber identity module from the user terminal, insert of a new subscriber identity module to the user terminal, change of a tracking area or a location area of the user terminal, expiry of a predetermined time duration, detection of a predetermined user action related to the user terminal;
   the information element comprises a list indicating only those PLMNs where the first RAT has been marked as disabled;
   the information element is associated with a PLMN selector list maintained in a subscriber identity module of the user terminal, wherein the PLMN selector list comprises at least one RAT candidate for at least one PLMN; and
   the information element is located in the subscriber identity module of the user terminal.

10. The method of claim 1, further comprising:
    updating the information element each time the first RAT in a PLMN, which is currently not comprised in the information element, has been marked as disabled, or when at least part of the information element is invalidated with respect to at least one PLMN currently comprised in the information element.

11. An apparatus for a user terminal, the apparatus comprising:
    a processing system including at least one processor and at least one memory including computer program code, wherein the at least one memory and the computer program code are configured, with the at least one processor, to cause the apparatus at least to:
    detect a preference of a user terminal for a predetermined service, wherein the user terminal is currently connected to a first public land mobile network, PLMN, at the current location of the user terminal via a first radio access technology, RAT;
    detect that the first RAT does not provide the predetermined service;

monitor whether or not another PLMN or another RAT of the first PLMN is available;

if, based upon the monitoring, it is detected that another PLMN or another RAT of the first PLMN is available, consider the first RAT of the first PLMN as disabled due to lack of the predetermined service from the first RAT, and generate an information element to a memory according to which the first RAT of the first PLMN has been marked as disabled, wherein the information element is valid until a predetermined criterion is met and at least beyond a point of time when the user terminal switches to another PLMN and/or to another RAT and wherein the information element while valid is usable to avoid selecting to connect back to the first PLMN via the first RAT, upon detecting that a second PLMN different than the first PLMN is available, register to the second PLMN; and while being registered to the second PLMN, perform a background scan of available PLMNs for selecting a higher priority PLMN to attempt registration to, wherein the selection is at least partially based on the valid information element.

12. The apparatus of claim 11, wherein the apparatus is further caused to:
if, based upon the monitoring, it is detected that no other PLMN and no other RAT of the first PLMN is available, maintain connection to the first RAT of the first PLMN until another PLMN or another RAT in the first PLMN becomes available.

13. The apparatus of claim 12, wherein the apparatus is further caused to:
detect a tracking area identifier of the first PLMN where the first RAT is considered as disabled; and
associate the information element with the detected tracking area identifier in order to store information according to which the first RAT of the identified tracking area of the first PLMN has been marked as disabled.

14. The apparatus of claim 11, wherein the apparatus is further caused to at least one of:
consider the first PLMN for the selection when the first PLMN becomes available via a second RAT different than the first RAT; and
consider the first PLMN for the selection when the first PLMN becomes available via another tracking area different than the identified tracking area.

15. The apparatus of claim 11, wherein the second PLMN has a lower selection priority than the first PLMN.

16. The apparatus of claim 11, wherein at least one of:
the information element comprises information according to which the first RAT has been marked as disabled in a plurality of PLMNs when there is a plurality of PLMNs to which the user terminal has been registered to but which are available only via the first RAT; and
the predetermined criterion for invalidating the information element with respect to at least one PLMN comprises, while being registered to the second PLMN, detection that the first PLMN becomes available via the second RAT different than the first RAT.

17. The apparatus of claim 11, wherein the apparatus is further caused to:
upon detecting that no other PLMN is currently available and a second RAT of the first PLMN becomes available, connect to the second RAT, wherein the information element is generated upon the connection to the second RAT.

18. The apparatus of claim 17, wherein the apparatus is further caused to:
while being connected to the second RAT of the first PLMN, perform a background scan of available RATS for selecting a higher priority RAT to connect to, wherein the selection is at least partially based on the valid information element.

19. The apparatus of claim 18, wherein the apparatus is further caused to:
consider the first RAT for the selection only when the first RAT becomes the only available RAT for the first PLMN.

20. The apparatus of claim 11, wherein at least one of:
the first RAT is a packet switching based RAT, and the predetermined service is a service provided by a RAT supporting circuit switching;
the predetermined criterion for invalidating the information element with respect to at least one PLMN comprises at least one of the following: switching off the user terminal, removal of subscriber identity module from the user terminal, insert of a new subscriber identity module to the user terminal, change of a tracking area or a location area of the user terminal, expiry of a predetermined time duration, detection of a predetermined user action related to the user terminal;
the information element comprises a list indicating only those PLMNs where the first RAT has been marked as disabled;
the information element is associated with a PLMN selector list maintained in a subscriber identity module of the user terminal, wherein the PLMN selector list comprises at least one RAT candidate for at least one PLMN;
the information element is located in the subscriber identity module of a user terminal;
the apparatus is further caused to update the information element each time the first RAT in a PLMN, which is currently not comprised in the information element, has been marked as disabled, or when at least part of the information element is invalidated with respect to at least one PLMN currently comprised in the information element; and
the apparatus is a user equipment, a user terminal or a mobile terminal.

21. A non-transitory computer readable memory storing a computer program executable by a processor and comprising instructions which, when loaded into an apparatus for a user terminal, causes performance of operations comprising:
detecting a preference of the user terminal for a predetermined service, wherein the user terminal is currently connected to a first public land mobile network, PLMN, at a current location of the user terminal via a first radio access technology, RAT;
detecting that the first RAT does not provide the predetermined service;
monitoring whether or not another PLMN or another RAT of the first PLMN is available; and
if, based on the monitoring, it is detected that another PLMN or another RAT of the first PLMN is available, considering the first RAT of the first PLMN as disabled due to lack of the predetermined service from the first RAT, and generating an information element to a memory according to which the first RAT of the first PLMN has been marked as disabled, wherein the information element is valid until a predetermined criterion is met and at least beyond a point of time when the user terminal switches to another PLMN and/or to another RAT, and wherein the information element while valid is usable to avoid selecting to connect back to the first PLMN via the first RAT, upon detecting that a second PLMN different than the first PLMN is available, registering to the second PLMN; and while being registered to the second PLMN, performing a background scan of available PLMNs for selecting a higher priority PLMN to attempt registration to, wherein the selection is at least partially based on the valid information element.

* * * * *

UNITED STATES PATENT AND TRADEMARK OFFICE
CERTIFICATE OF CORRECTION

| | | |
|---|---|---|
| PATENT NO. | : 8,504,017 B1 | Page 1 of 1 |
| APPLICATION NO. | : 13/633926 | |
| DATED | : August 6, 2013 | |
| INVENTOR(S) | : Hannu Petri Hietalahti and Samuli Heikkinen | |

It is certified that error appears in the above-identified patent and that said Letters Patent is hereby corrected as shown below:

In the Claims:

Column 15, Claim 13 should read as follows:

--13. The apparatus of claim 11, wherein the apparatus is further caused to:
   detect a tracking area identifier of the first PLMN where the first RAT is considered as disabled;
   and associate the information element with the detected tracking area identifier in order to store information according to which the first RAT of the identified tracking area of the first PLMN has been marked as disabled.--

Signed and Sealed this
Twenty-second Day of October, 2013

Teresa Stanek Rea
*Deputy Director of the United States Patent and Trademark Office*